United States Patent [19]
Thoese

[11] 4,202,923
[45] May 13, 1980

[54] DRAWING LAYER FOR PLASTIC FILMS

[75] Inventor: Klaus Thoese, Wiesbaden, Fed. Rep. of Germany

[73] Assignee: Hoechst Aktiengesellschaft, Fed. Rep. of Germany

[21] Appl. No.: 860,850

[22] Filed: Dec. 15, 1977

[30] Foreign Application Priority Data

Dec. 16, 1976 [DE] Fed. Rep. of Germany ....... 2656925

[51] Int. Cl.² ........................... B32B 1/00; B32B 3/00
[52] U.S. Cl. .................................... 428/144; 428/145; 428/482; 428/483; 428/412; 428/510; 428/575
[58] Field of Search ............... 428/144, 482, 145, 483, 428/412, 510, 515

[56] References Cited

U.S. PATENT DOCUMENTS 3,115,420 12/1963 Centa et al. ...................... 428/483 X
3,928,697 12/1975 Mallinson et al. ............... 428/148 X

FOREIGN PATENT DOCUMENTS 1059073 2/1967 United Kingdom ..................... 428/910

*Primary Examiner*—P. C. Ives
*Attorney, Agent, or Firm*—James E. Bryan

[57] ABSTRACT

This invention relates to an improvement in a drawing layer for a plastic film, in particular for a polyester film, said drawing layer being adherent to the film and comprising a cellulose ester crosslinked by a formaldehyde resin, and including a matt-finishing agent and/or a pigment, the improvement which comprises that the drawing layer additionally contains at least one copolymer containing maleic anhydride units.

5 Claims, No Drawings

DRAWING LAYER FOR PLASTIC FILMS

The present invention relates to a drawing layer for plastic films, in particular such a drawing layer composed of a polymeric material on polyester films, which is composed of cellulose esters which are cross-linked by formaldehyde resins, matt-finishing agents and/or pigments and which has been applied, if necessary, with the aid of an adhesive layer.

Drawing layers combined with plastic films have become important. They must meet a large number of technological requirements. In the case of materials which are to be universally employed, it must be possible not only to write on them with pencils of up to fairly high hardness, but also to write on them in the same manner with drawing inks, the inscription adhering firmly and having sharp outlines. It should be possible without difficulty to make corrections in various ways on pencil drawings and ink drawings, i.e. the stroke which is to be corrected must be easily removable and the point, where the correction was made, must then take pencil and ink as readily as before. Especially high-grade drawing layers should be insoluble in common liquid cleaners which are used for prior cleaning of the drawing surfaces.

Cellulose esters have proved suitable as binders for drawing layers (DT-AS 1,461,260) because they do not possess pronounced thermoplastic properties and therefore do not lose their hardness even at elevated temperatures, such as can act on drawing layers during copying processes, and they do not turn yellow upon storage.

Drawing layers of this type, however, do not have adequate adhesion for ink and are readily soluble in cleaners which are employed for prior cleaning and for correcting inks. For this reason, cellulose ester layers also already have been cross-linked, i.e. rendered insoluble in solvents, by combining them with formaldehyde resins and a small amount of acid as a catalyst.

Matt-finishing additives to provide the facility for pencil writing have been extensively described and are composed of finely particulate inorganic products, such as silica, aluminum silicate, alumina, powdered glass and the like. Examples of pigments which can be used are titanium dioxide, barium sulfate or stable inorganic or organic dyed materials.

To achieve good adhesion of ink on drawing layers of cellulose ester, they are used with high proportions of formaldehyde resins. This can impair the good properties of cellulose esters, such as, for example, their resistance to yellowing under the action of light, and there is a risk of the cross-linking reactions between the cellulose ester and the formaldehyde resin continuing after the recording material has been filed, so that layers with permanently constant properties are not obtained or that, in an extreme case, the layers become brittle.

Cellulose ester layers with desirably low proportions of formaldehyde resins, however, do not possess good adhesion for ink, when in the cross-linked state. If sufficient matt-finishing agent is added to the layers so that their surface becomes porous and the ink can thus adhere well due to penetration, the ink lines can no longer be corrected.

The application of a thin layer of an alkyl monoester of poly(alkyl vinyl ether/maleic acid) onto layers of cellulose esters also has been disclosed (DT-OS 2,342,601). The disadvantage of this process is that, in a separate operation, a surface must be produced on the cellulose ester layer, which surface takes ink and India ink in a suitable manner. During processing steps, the known layers can tend to stick and can be readily detached even by small amounts of an agent for prior cleaning of drawing surfaces. This eliminates their positive effect on the facility for writing thereon with ink.

Matt-finishing agents for the matt-finishing of polyester films have also been disclosed (DT-OS 1,519,118); these consist of vinylidene chloride copolymers, titanium dioxide, dispersing agents, polishing agents and thickeners and are processed from an aqueous solution. Interpolymers which can contain methyl vinyl ether and maleic anhydride as the monomers, are also mentioned as thickeners which are added in small amounts. The disadvantage of layers consisting of vinylidene chloride copolymers is their pronounced yellowing, because poly-ene structures readily can form as the result of elimination of hydrochloric acid. Ultimately, they have proved unsuitable in practice.

It is the object of the present invention to avoid the disadvantages described and to provide a drawing layer which does not show yellowing, does not embrittle, can be produced in one operation by conventional practice, which is insoluble in solvents which are used for prior cleaning, on which it is possible to write with pencil and also with drawing inks, the writing adhering firmly, and the composition of which also permits multiple correction of pencil lines and ink lines using commercially available erasers or liquid correcting agents.

According to the invention, this object is achieved by a drawing layer for plastic films, in particular for polyester films, which is composed of cellulose esters which are cross-linked by formaldehyde resins, matt-finishing agents and/or pigments and adheres to the film, if necessary with the aid of an adhesive layer, when the drawing layer additionally comprises at least one copolymer containing maleic anhydride units. The copolymer added amounts here to about 5 to 50, preferably 10 to 30, percent by weight, relative to the cellulose ester proportion.

The result of this is that a drawing layer is obtained which does not yellow or embrittle and which can be manufactured easily. It is resistant to agents for prior cleaning, it permits writing with pencil and also with inks, the writing adhereing firmly, and allows multiple corrections of pencil lines or ink lines using commercially available erasers or liquid correcting agents, without the quality of the layer deteriorating.

Plastic films which can be used are those composed of polyvinyl chloride, polycarbonate, polystyrene, polyolefin, or of polyalkylene terephthalate or cellulose ester. Due to the excellent dimensional stability which is particularly important for drawing films, films based on polyester, such as polyethylene terephthalate, are preferentially employed.

Suitable formaldehyde resins are condensation products which are obtained from melamine, urea, benzoguanamine and similar products with formaldehyde and which are converted into a form soluble in organic solvents by etherifying them with alcohols in a suitable manner.

Particularly suitable cellulose esters are cellulose acetates, cellulose acetobutyrates and cellulose propionates or cellulose acetopropionates. The cross-linking of the components is carried out in an acid medium. Examples of catalysts which can be employed are sulfosalicyclic acid, citric acid, p-toluene sulfonic acid or acid phosphoric acid esters.

The adhesive layers can be those which are produced, for example, by the process according to DT-AS 1,694,534, and which are composed of a polymeric material.

According to the invention, the useful copolymers employed which comprise maleic anhydride units, are those with methyl vinyl ether, ethylene or styrene or with mixtures of these substances. For reasons of compatibility of the copolymers with the other components employed in an organic solution, copolymers which do not have excessive molecular weights are preferentially suitable. Copolymers of maleic anhydride and ethylene, which, as a 2% by weight aqueous solution, have viscosities in the range of about 4–8 centipoises, have proved very particularly advantageous. A copolymer of maleic anhydride and methyl vinyl ether, which, as a 1% by weight solution in methyl ethyl ketone, has a specific viscosity between 0.1 and 2 at 25° C., also has proved to be very suitable.

It has proved very advantageous, in the manufacture of the drawing layers according to the invention, to process the organic solution rapidly, if solvents, such as, for example, alcohols, which can react with the maleic anhydride group, are used. Presumably, the presence of the unchanged anhydride grouping in the drawing layer is of decisive importance.

The hydrophilic character of the surface, moreover, can be vaired by a suitable selection of the added copolymer. Thus, when a copolymer of maleic anhydride and ethylene is used, it is possible to obtain substantially improved wetting of the surface with water.

The drawing layer according to the invention also can contain chemicals conventional in the diazotype process and can be used as a photoprinting layer, on which it is possible to write.

The drawing layer according to the invention and its manufacture is explained in more detail wth the aid of the examples which follow, without this constituting any restriction.

EXAMPLE 1

Clear lacquer films are cast, using a 10 cm wide film-spreader having a gap width of 0.2 mm, onto an approximately 50μ thick film of polyethylene terephthalate, which had been finished with an adhesive layer composed of polyvinylidene chloride copolymer according to DT-AS 1,694,534. 8% by weight solutions of cellulose acetopropionate and a butylated urea/formaldehyde resin in a solvent mixture of about 75% by weight of acetone, alcohols and up to 4% by weight of ethylene glycol monomethyl ether as a high-boiling medium, are used. p-Toluenesulfonic acid is used as a curing accelerator. Copolymers, such as are commercially known under the name Gantrez ® from GAF, USA; Lytron ® or EMA ® from Monsanto Corp., USA; Mowilith ® from Hoechst AG and Viscofas ® from ICI, Great Britain, are added to the solutions in accordance with Table I. The films are pre-dried for one minute in air and after-dried for three minutes at 110° C. in a drying cabinet and are then cured for five minutes at 150° C.

Lines are then drawn, using a drawing pen, with the commercially available drawing inks, for example ink T, ink TT and ink TN from Rotring, onto the films of approximately 10–12μ m thickness.

The ink lines are then very thoroughly dried for two hours at 80° C. and the adhesion of the ink is tested by an adhesive tape test. For this purpose, Tesa tape is pressed onto the ink line, using a folding stick, and peeled off again with a jerk. With good adhesion of the ink, hardly any traces of the stroke are visible on the tape. With poor adhesion, however, a considerable part of the ink line is removed with the adhesive tape.

The composition of the lacquer films and the test results can be seen from Tables I and II.

The cellulose acetopropionate (CAP) used contains 3.6% of acetyl groups, 44.7% of propionyl groups and 1.8% of hydroxyl groups and has, as a 20% by weight solution in acetone/ethanol 72:8, a viscosity of 53–91 poises.

The butylated urea/formaldehyde resin (BUR) used is a commercially available product having an acid number of less than 3 and possesses, as a 65% by weight solution in isobutanol, a dynamic viscosity of 1,000–1,200 centipoises at 20° C.

Table I

Summary of the additives for modifying the drawing layers

| Designation of the Additives in Table II | Chemical Composition |
|---|---|
| A | Copolymer of maleic anhydride and methyl vinyl ether - low viscosity type ($\eta_{spec.}$ 0.1–0.5) |
| B | As A - medium viscosity type ($\eta_{spec.}$ ~1–2) |
| C | As A - high viscosity type ($\eta_{spec.}$ >2) |
| D | Copolymer of maleic anhydride and styrene, molecular weight 20,000 and acid number 180 |
| E | Copolymer of maleic anhydride and ethylene, viscosity of a 2% by weight solution in water: 7 cp |
| F | Copolymer of crotonic acid and vinyl acetate, acid number about 45 |
| G | Monoethyl ester of a copolymer of maleic acid and methyl vinyl ether |
| H | Mixed monoester of a copolymer of maleic acid and methyl vinyl ether. Isopropyl alcohol and butyl alcohol as esterification components. |

TABLE II

| Test No. | Composition of the film % CAP | BUR | Copolymer | Designation of the additive | Appearance of the film | Adhesion of the ink, average of the three inks |
|---|---|---|---|---|---|---|
| 1 | 93 | 7 | — | — | clear | poor |
| 2 | 65 | 5 | 30 | A | clear | good |
| 3 | 84 | 6 | 10 | A | clear | good |
| 4 | 65 | 5 | 30 | B | clear | good |
| 5 | 84 | 6 | 10 | B | clear | good |
| 6 | 65 | 5 | 30 | C | turbid | good-moderate |
| 7 | 84 | 6 | 10 | C | clear | good |
| 8 | 65 | 5 | 30 | D | clear | good |
| 9 | 84 | 6 | 10 | D | clear | good-moderate |
| 10 | 65 | 5 | 30 | E | clear | good |
| 11 | 84 | 6 | 10 | E | clear | good |
| 12 | 65 | 5 | 30 | F | clear | moderate |
| 13 | 84 | 6 | 10 | F | clear | poor |
| 14 | 65 | 5 | 30 | G | clear | poor |
| 15 | 84 | 6 | 10 | G | clear | poor |
| 16 | 65 | 5 | 30 | H | clear | poor |
| 17 | 84 | 6 | 10 | H | tubid | poor |

It can be clearly seen from this that the copolymers having maleic anhydride groups provide the desired good properties.

EXAMPLE 2

Films as described in Example 1 are used, but they have been produced on a coating machine. Additionally, they contain, as a matt-finishing agent, a mixture of finely particulate, precipitated silica with alumina, so that it is possible to write on the surface with pencils.

The composition of the comparative film is 60.0% of cellulose acetopropionate, 35.0% of matt-finishing agent mixture, 4.8% of butylated urea/formaldehyde resin and 0.2% of p-toluenesulfonic acid.

10% of the additive named in Example 1, relative to cellulose acetopropionate, is employed in the layers according to the invention.

| Designation | Adhesion of the ink | | | Correctibility of Ink TT with a moistened |
|---|---|---|---|---|
| of the sample | Ink T | Ink TT | Ink TN | rubber eraser |
| Comparative film | poor | poor | moderate to poor | moderate to poor |
| Substance B | good | good | good | good |
| Substance D | good | good | good | moderate |
| Substance E | good | good | good | good |

A rubber eraser, wetted with water, which is commercially available under the name "Edding-Plast R 20", was used for the correction. If a layer has a good correctibility, there must be no remaining so-called "ghost images". The ease of writing with pencils and the correction of the pencil lines are perfect in all cases.

EXAMPLE 3

The procedure followed is as in Example 1, using an acetobutyrate as the cellulose ester. The cellulose acetobutyrate is a product having a viscosity of 46–76 poises, measured on a 20% by weight solution in acetone. The cellulose ester contains 14.3% of acetyl groups, 37.1% of butyryl groups and 1.25% of hydroxyl groups.

A copolymer of maleic anhydride and methyl vinyl ether in a formulation of medium viscosity (substance B from Example 1) is added as the additive according to the invention.

| | Composition of the film (%) | | | Appearance of | Adhesion of the ink, average of the three Rotring inks T, TT |
|---|---|---|---|---|---|
| No. | CAB | BUR | Copolymer B | the film | and TN |
| 1 | 93 | 7 | — | clear | poor |
| 2 | 65 | 5 | 30 | clear | good |

-continued

| | Composition of the film (%) | | | Appearance of | Adhesion of the ink, average of the three Rotring inks T, TT |
|---|---|---|---|---|---|
| No. | CAB | BUR | Copolymer B | the film | and TN |
| 3 | 84 | 6 | 10 | clear | good |

EXAMPLE 4

Films are produced as described in Example 2. The additive used is a copolymer which, in its composition, corresponds to the Substance E in Table I, but the 2% by weight solution of which in water has a viscosity of only 5 centipoises. The substance is given the abbreviated symbol I.

| Designation | Adhesion of the ink | | | Ink TT when corrected with a moistened |
|---|---|---|---|---|
| of the sample | Ink T | Ink TT | Ink TN | rubber eraser |
| Comparative film | poor | poor | moderate to poor | moderate to poor |
| Film with substance I | good | good | good | good |

It will be obvious to those skilled in the art that many modifications may be made within the scope of the present invention without departing from the spirit thereof, and the invention includes all such modifications.

What is claimed is:

1. In a drawing layer for a plastic film, in particular for a polyester film, said drawing layer being adherent to the film and comprising a cellulose ester crosslinked by a formaldehyde resin, and including a matt-finishing agent and/or a pigment, the improvement which comprises that the drawing layer is adherent to the film by means of an adhesive layer composed of polymeric material, said drawing layer additionally containing about 5 to 50% by weight, based on the weight of the cellulose ester, of at least one copolymer containing maleic anhydride units having unchanged anhydride groups.

2. A drawing layer according to claim 1 wherein the copolymer added amount to about 10–30 percent by weight, based on the weight of the cellulose ester.

3. A drawing layer according to claim 1 in which the copolymer is of maleic anhydride with methyl vinyl ether, ethylene or styrene or mixtures thereof.

4. A drawing layer according to claim 3 in which the copolymer is of ethylene and maleic anhydride, which, as a 2% by weight aqueous solution, has a viscosity in the range of about 4–8 centipoises.

5. A drawing layer according to claim 3 wherein the copolymer is of methyl vinyl ether and maleic anhydride, which, as a 1% by weight solution in methyl ethyl ketone, has a specific viscosity between 0.1 and 2.0 at 25° C.

* * * * *